(12) United States Patent
Suresh et al.

(10) Patent No.: US 6,208,990 B1
(45) Date of Patent: Mar. 27, 2001

(54) METHOD AND ARCHITECTURE FOR AUTOMATED OPTIMIZATION OF ETL THROUGHPUT IN DATA WAREHOUSING APPLICATIONS

(75) Inventors: Sankaran Suresh, Santa Clara; Jyotindra Pramathnath Gautam, Fremont; Girish Pancha, San Francisco; Frank Joseph DeRose, Fremont; Mohan Sankaran, Union City, all of CA (US)

(73) Assignee: Informatica Corporation, Palo Alto, CA (US)

( * ) Notice: Subject to any disclaimer, the term of this patent is extended or adjusted under 35 U.S.C. 154(b) by 0 days.

(21) Appl. No.: 09/116,426

(22) Filed: Jul. 15, 1998

(51) Int. Cl.[7] ................................................ G06F 17/30
(52) U.S. Cl. ........................ 707/6; 707/10; 707/100; 707/102; 707/104; 707/200
(58) Field of Search ..................... 707/102, 10, 100–3, 707/104, 200, 201; 395/149; 414/786

(56) References Cited

U.S. PATENT DOCUMENTS

| | | | | |
|---|---|---|---|---|
| 5,403,147 | * | 4/1995 | Tanaka | 414/786 |
| 5,563,999 | * | 10/1996 | Yaksich et al. | 395/149 |
| 5,675,785 | * | 10/1997 | Hall et al. | 395/613 |
| 5,781,911 | * | 7/1998 | Young et al. | 707/201 |
| 6,014,670 | * | 1/2000 | Zamanian et al. | 707/101 |
| 6,032,158 | * | 2/2000 | Mukhopadhyay | 707/201 |
| 6,044,374 | * | 3/2000 | Nesamoney et al. | 707/10 |

FOREIGN PATENT DOCUMENTS

99/24922  5/1999  (WO)  ............... G06F/17/30

OTHER PUBLICATIONS

Weyman, P.J., "The Case For A Process–Driven Approach to Data Warehousing", Database and Network Journal, vol. 27, No. 1, Feb. 1, 1997, pp. 3–6.
Squire, C., "Data Extraction and Transformation for the Data Warehouse", ACM Proceedings of Sigmod, Intl Conference on Management of Data, vol. 24, No. 1, Mar. 1, 1995, p. 446/447.
White, C., "Managing Data Transformations", Byte, vol. 22, No. 12, Dec. 1, 1997, p. 53/54.
White, C., "Data Warehousing: Cleaning and Transforming Data", INFO DB, vol. 10, No. 6, Apr. 1997 p. 11/12.

* cited by examiner

*Primary Examiner*—Thomas G. Black
*Assistant Examiner*—Thuy Do
(74) *Attorney, Agent, or Firm*—Wagner, Murabito & Hao LLP

(57) ABSTRACT

A computer software architecture to automatically optimize the throughput of the data extraction/transformation/loading (ETL) process in data warehousing applications. This architecture has a componentized aspect and a pipeline-based aspect. The componentized aspect refers to the fact that every transformation used in this architecture is built up with transformation components selected from an extensible set of transformation components. Besides simplifying source code maintenance and adjustment for the data warehouse users, these transformation components also provide these users the building blocks to effectively construct pertinent and functionally sophisticated transformations in a pipelined manner. Within a pipeline, each transformation component automatically stages or streams its data to optimize ETL throughput. Furthermore, each transformation either pushes data to another transformation component, pulls data from another transformation component, or performs a push/pull operation on the data. Thereby, the pipelining; staging/streaming; and pushing/pulling features of the transformation components effectively optimizes the throughput of the ETL process.

16 Claims, 9 Drawing Sheets

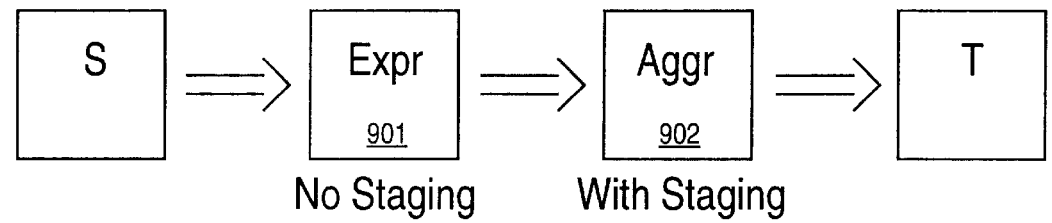
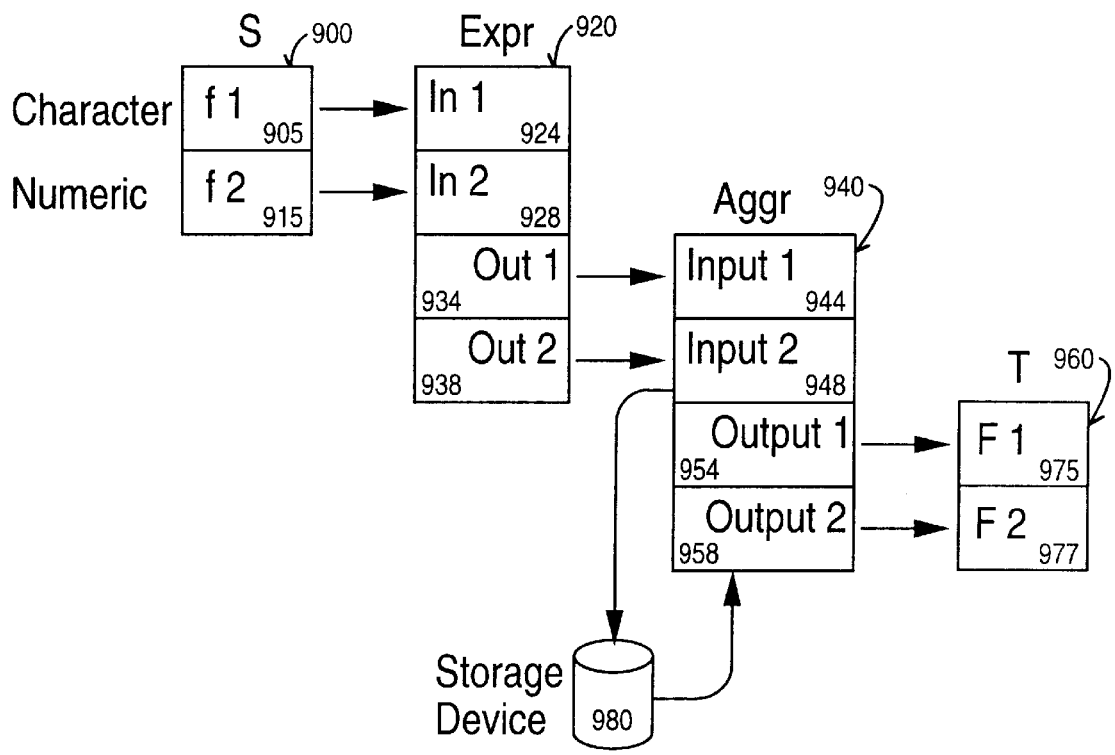
Figure 9

METHOD AND ARCHITECTURE FOR AUTOMATED OPTIMIZATION OF ETL THROUGHPUT IN DATA WAREHOUSING APPLICATIONS

FIELD OF THE INVENTION

The present invention relates to database systems. More particularly, the present invention pertains to an apparatus and method for automating optimal throughput of data extraction/transformation/loading (ETL) process in data warehousing applications.

BACKGROUND OF THE INVENTION

Due to the increased amounts of data being stored and processed today, operational databases are constructed, categorized, and formatted in a manner conducive for maximum throughput, access time, and storage capacity. Unfortunately, the raw data found in these operational databases often exist as rows and columns of numbers and code which appears bewildering and incomprehensible to business analysts and decision makers. Furthermore, the scope and vastness of the raw data stored in modern databases renders it harder to analyze. Hence, applications were developed in an effort to help interpret, analyze, and compile the data so that a business analyst may readily and easily understand it. This is accomplished by mapping, sorting, and summarizing the raw data before it is presented for display. Thereby, individuals can now interpret the data and make key decisions based thereon.

Extracting raw data from one or more operational databases and transforming it into useful information is the function of data "warehouses" and data "marts." In data warehouses and data marts, the data is structured to satisfy decision support roles rather than operational needs. Before the data is loaded into the target data warehouse or data mart, the corresponding source data from an operational database is filtered to remove extraneous and erroneous records; cryptic and conflicting codes are resolved; raw data is translated into something more meaningful; and summary data that is useful for decision support, trend analysis or other end-user needs is pre-calculated. In the end, the data warehouse is comprised of an analytical database containing data useful for decision support. A data mart is similar to a data warehouse, except that it contains a subset of corporate data for a single aspect of business, such as finance, sales, inventory, or human resources. With data warehouses and data marts, useful information is retained at the disposal of the decision-makers.

One major difficulty associated with implementing data warehouses and data marts relates to that of transporting data, in a non-invasively and timely manner, from the operational databases to the data warehouses and/or data marts. The data in the operational databases must be non-invasively synchronized with the data in the data warehouse databases. As new transactions occurs, vast amounts of new data are being generated and stored in the operational databases. Under this situation, if the new data is not transported to the data warehouse databases by the time of analysis, these data warehouses become "out of synch" with the operational databases. Thereby, the data within the data warehouse loses its pertinence for the analysis that leads to decision support. Furthermore, if the data transport process is not scheduled to occur during specific time windows during which the operational databases are processing the minimum amount of transactional data, the performance of the operational databases could be seriously compromised. In fact, because the process of data transport (data extraction/transformation/loading) slows down the operational databases, some organizations leave a small nightly window for the data transport process, such as from one to two in the morning.

In early data warehouse implementations, the approaches for non-invasive data transport were to schedule each session of data transport months apart. For example, a session of data transport from an operational database system of 100 Gigabytes might require a full day, but the data transport was only performed once a month. Today, monthly refreshes of data warehouses are generally not viable. In keeping with the proliferation of data mining software applications that capture the rich data patterns hidden inside the data warehouses, some organizations might even require hourly refreshes. Thus, the approaches for non-invasive data transport now focus on increasing the throughput of data transporting process, whereby the whole data transport process can be completed within the narrow time windows allowed. In other words, the pursuit of optimizing throughput (i.e., speed) has begun.

Currently, in order to improve throughput, each organization studies its own unique data warehousing requirements and designs tailor-made application program to automate the extraction/transformation/loading process. But given the size and scope of the operational databases and given that there might exist numerous operational databases and many different types of data marts, this approach requires a monumental software development effort for incorporating, synchronizing, and updating the changes made to an operational databases so that they are appropriately reflected in the data warehouses and data marts. As a result, the tailor-made application program created to improve the throughput has also become correspondingly complex and monolithic. The application program(s) supposedly created to improve the throughput of data extraction, transformation, and loading processes have, in turn, created its own problems.

One glaring problem pertains to the "inertia", or resistance to change, of the monolithic application created. In order to implement new changes to the program or simply to accommodate new data, organizations need experts well versed in C++, COBOL, and SQL to maintain and adjust the source code. Another problem relates to the "fragility" of the program. Because the program is structured as a monolithic block of codes, making even minor changes to the codes might inadvertently introduce new errors into the application that require time consuming source code fixes. As an example of the risk involved, the fragility of the source code could mean disaster for mission critical data warehousing applications commonly used in the utility and manufacturing industries for forecasting equipment failures. All in all, the stage is set for a new breed of software application programs that not only improves throughput of data ETL process, but also addresses and overcomes the inertia and fragility of the current application programs. The present invention overcomes both problems.

SUMMARY OF THE INVENTION

The present invention is a computer software architecture that automatically optimizes the throughput of data transport process (e.g., extraction, transformation, and loading) in data warehousing, while overcoming the inertia and the fragility exhibited by current methods of improving throughput. More specifically, the present invention introduces a componentized and pipeline-based ETL architecture that is flexible, robust, and extensible in automating optimization of ETL throughput in data warehousing.

One of the novel characteristics of the present invention is that its architecture enables not only efficiency for the automated portion of the software, but goes further to also enable efficiency for the manual implementation part of the software. This componentized and pipeline-based architecture of the transformation server organizes the data ETL process such that optimal efficiency is gained both on the automated side and the manual side.

In one embodiment, the present invention introduces a componentized approach for implementing transformation in order to address the problems originating from the monolithic nature of the current throughput enhancing application programs. The pipeline-based approach allows the data extraction, transformation, and loading process to take full advantage of either a sequential or a parallel hardware platform, thus optimizing throughput. More specifically, the componentized aspect of the present invention refers to the analysis of current transformations being used in the data ETL process and the identification of an extensible set of elemental transformations that form a basis for building up other transformations. This set is extensible because new transformations can be added to this set. In fact, one of the sources from which to identify and isolate elemental transformation components is from the traditional monolithic transformations. At the same time, this set of transformation components allows previously unavailable transformation to be built up from these elemental transformation components. Consequently, having an extensible set of transformations promotes sharing and reuse of these transformation components. Furthermore, each transformation in this set is treated as one software component that has a certain built-in "autonomy" (that works with the transformation server).

The autonomy of each transformation software component is manifested in two dimensions. The first dimension of component autonomy relates to how each transformation component implements staging (storing) the incoming data fields as it processes these data fields. The degree of requisite staging by each transformation component is automatically determined and implemented, without any human intervention. Depending on the nature of the transformation, each transformation component will automatically select the optimal amount of staging. The staging can range continuously from zero staging (also know as streaming) to full staging. A transformation with zero staging is called streaming transformation. The second dimension of component autonomy relates to how each transformation component automatically selects its own mode of manipulating data input/output. Depending on the nature of the transformation, each transformation component, together with the server, automatically selects a push mode, a pull mode, or a push and pull mode that optimizes throughput.

Besides the componentized aspect of the architecture, the pipeline-based aspect of the architecture also plays a prominent role in this architecture. The pipeline-based aspect of the architecture enables the users to customize the extent of parallelism desired, thus taking full advantage of the parallel processing in the underlying computer hardware system. Furthermore, pipelining transformations offers two level of independence that lead naturally to parallel processing, and thus throughput enhancement. On one level, in the transformation server, each pipeline of transformations constitutes an independent unit for which the transformation server can dedicate a single tread, process or even a CPU. Thereby, multi-CPU computer can realize its full potential of parallelism in optimizing ETL throughput. Without the users' intervention, the transformation server automatically selects the pipelines to optimize the throughput of the data ETL process. It should be noted here that this pipeline-based approach also offers an extra degree of flexibility that allows the users to manually choose and implement the desired degree of parallelism.

At another level, the independence offered by the pipeline-based aspect of the architecture resides within the execution pipeline of transformations. More precisely, this level of independence actually resides in the push mode and/or pull mode of the data movement within each transformation component. If a transformation component is pulling a set of data fields in and pushing another set of data fields out, both of these two steps naturally constitute an independent unit for which the transformation server can, depending on the underlying computer hardware platform, dedicate a single tread, process, or CPU. Thus, the transformation component (together with the server) can automatically select the degree of parallelism that will optimize throughput of the data ETL process. And again, the users has the extra flexibility to manually customize the degree of parallelism desired to realize the full performance potential of the underlying computer hardware system for the transformation engine server.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 9 shows one pipeline of transformation components having staging and streaming.

DETAILED DESCRIPTION

An apparatus and method for automating optimal throughput of data extraction/transformation/loading (ETL) process in data warehousing applications is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

In the following detailed description of the present invention, some of the interchangeable key terms relating to the present invention are collected and defined in the section below to resolve possible ambiguity and to facilitate future reference.

ETL stands for the Extraction/Transformation/Loading process.

Data transport process is a data ETL process for a data transformation process.

Transformation engine is synonymous with a transformation server, which is a software server that hosts and oversees the data ETL process from the source databases to the target databases.

Source databases are operational databases from which raw data is extracted to be transformed in the transformation engine.

Target databases are data warehouses and/or data marts into which transformed data is loaded.

A transformation component is the same as a transformation object, which is a software binary file acting as an individual unit that possesses built-in autonomy and encapsulates the functionalities of a transformation.

Furthermore, unless specifically stated otherwise as apparent from the following discussions, it is appreciated that throughout the present invention, discussions utilizing terms such as "push", "pull", "stage" or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

Figure 1:
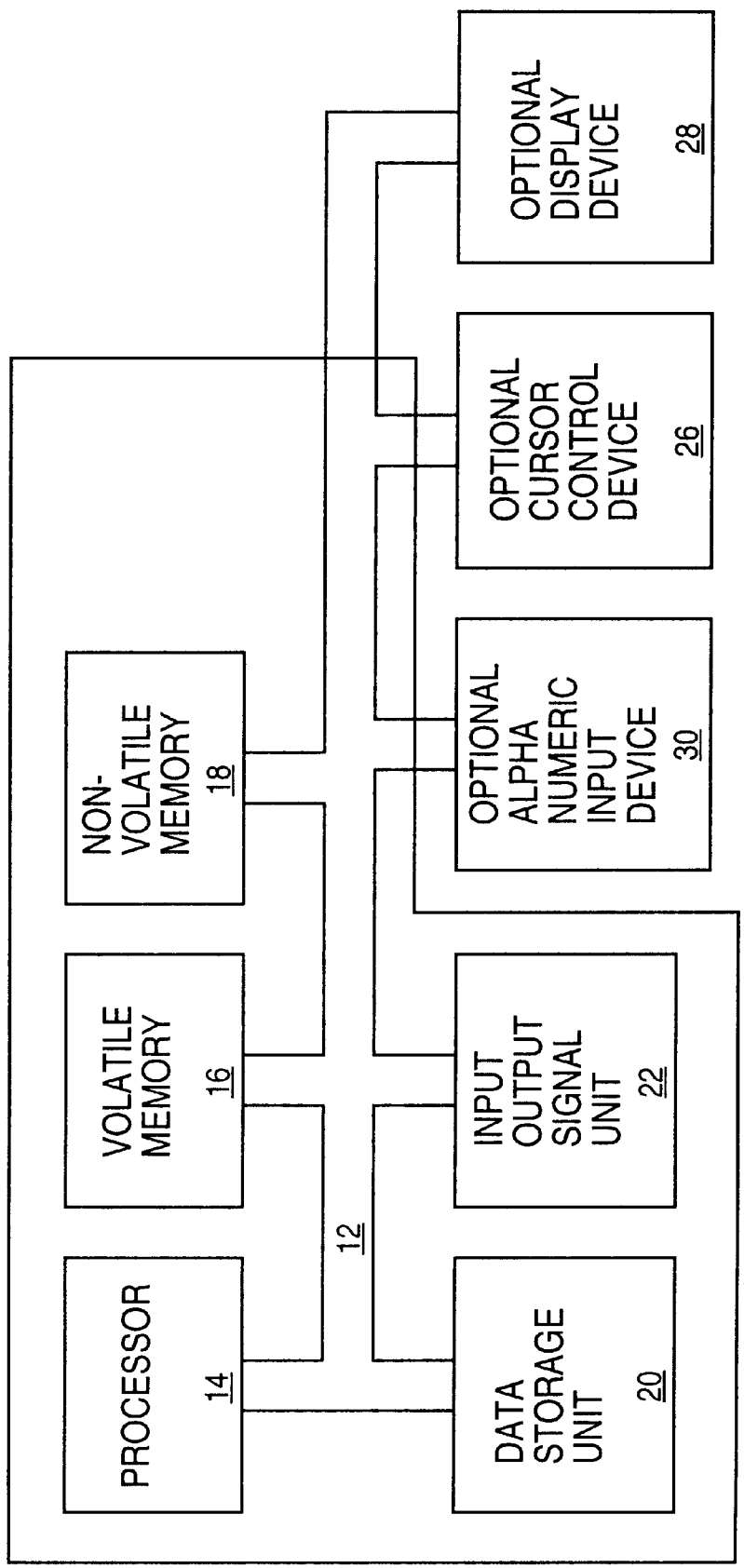
FIG. 1 illustrates an exemplary computer system used as part of a data warehousing system in accordance with one embodiment of the present invention.

With reference to FIG. 1, portions of the present invention are comprised of the computer-readable and computer executable instructions which reside, for example, in computer system 10 used as a part of a data warehousing system in accordance with one embodiment of the present invention. It is appreciated that system 10 of FIG. 1 is exemplary only and that the present invention can operate within a number of different computer systems including general-purpose computer systems, embedded computer systems, and stand-alone computer systems specially adapted for data warehousing applications. Computer system 10 includes an address/data bus 12 for conveying digital information between the various components, a central processor unit (CPU) 14 for processing the digital information and instructions, a main memory 16 comprised of volatile random access memory (RAM) for storing the digital information and instructions, a non-volatile read only memory (ROM) 18 for storing information and instructions of a more permanent nature. In addition, computer system 10 may also include a data storage unit 20 (e.g., a magnetic, optical, floppy, or tape drive) for storing vast amounts of data, and an I/O interface 22 for interfacing with peripheral devices (e.g., computer network, modem, mass storage devices, etc.). It should be noted that the software program for performing the ETL process can be stored either in main memory 16, data storage unit 20, or in an external storage device. Devices which may be coupled to computer system 10 include a display device 28 for displaying information to a computer user, an alphanumeric input device 30 (e.g., a keyboard), and a cursor control device 26 (e.g., mouse, trackball, light pen, etc.) for inputting data, selections, updates, etc.

Figure 2:
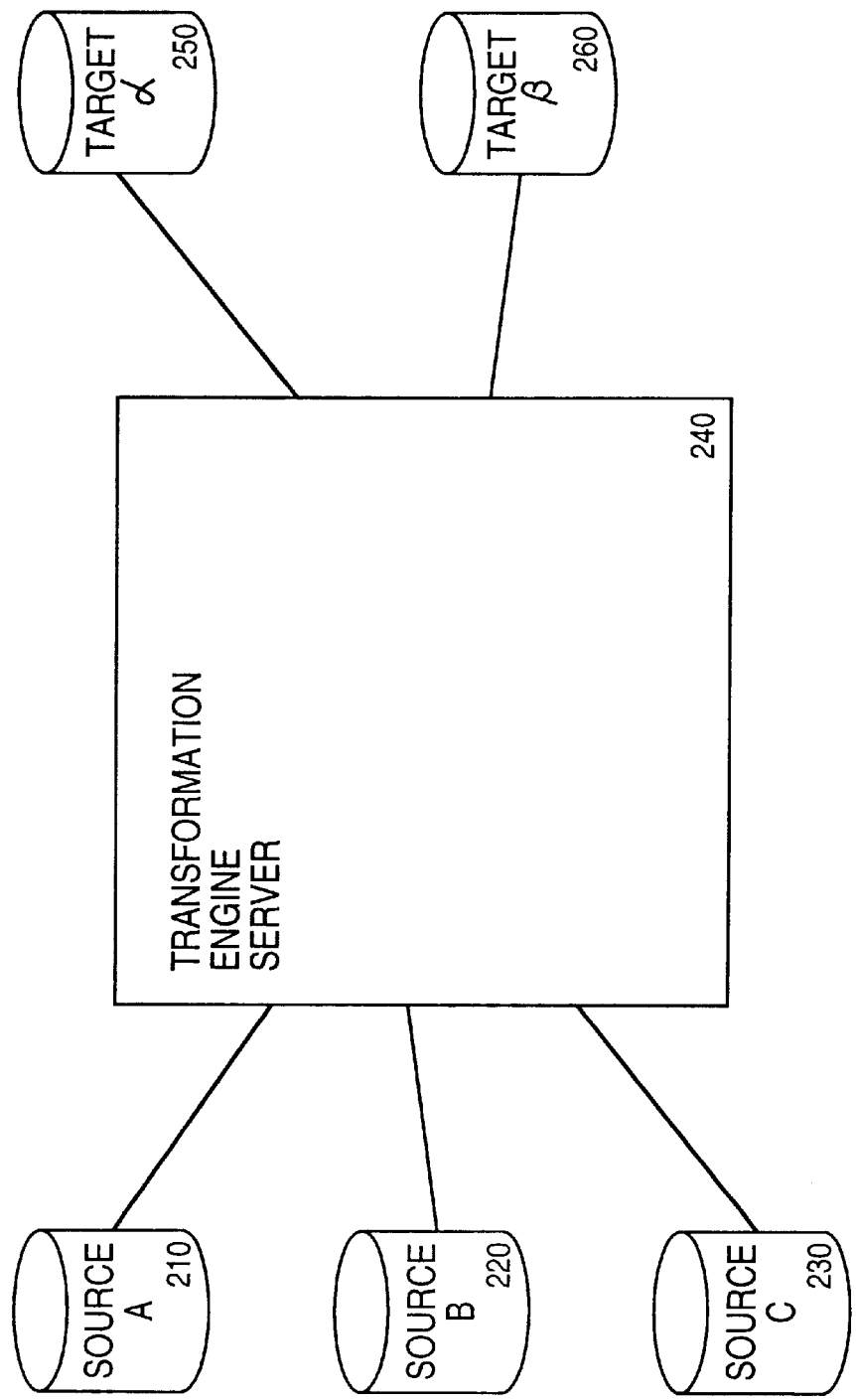
FIG. 2 illustrates one possible setting of the architecture that enables the data ETL (extraction/transformation/loading) process.

Furthermore, computer system 10 may be coupled in a network, such as in a client/server environment, whereby a number of clients (e.g., personal computers, workstations, portable computers, minicomputers, terminals, etc.), are used to run processes for performing desired tasks (e.g., inventory control, payroll, billing, etc.). FIG. 2 illustrates a typical computer network upon which an embodiment of the present invention may be practiced. The operational databases 210, 220, and 230 store the data resulting from business and financial transaction, and/or from equipment performance logs. These databases can be any of the conventional RDMS systems (such as from Oracle, Informix, Sybase, Microsoft, etc.) that reside within a high capacity mass storage device (such as hard disk drives, optical drives, tape drives, etc.). In the present embodiment of the present invention, these operational databases provide the data source from which the transformation engine server 240 can extract, transform, then load the data into the databases 250 and 260. Databases 250 and 260 are the data warehouses or data marts that are the targets of the data ETL process. And the transformation engine server 240 can be run inside a NT box, an UNIX box, or even a computer system possessing MP (multiple processor) architecture. Data relating to operational databases can be entered, updated, and retrieved by clients. A client is used to create a repository, which is used to keep track of session information as well as mapping information relating to how data is to be mapped and transformed from target tables of the operational databases to target tables of data marts. It would be appreciated by those with ordinary skill in the art that the present invention may be practiced in any number of different hardware configurations.

Figure 3:
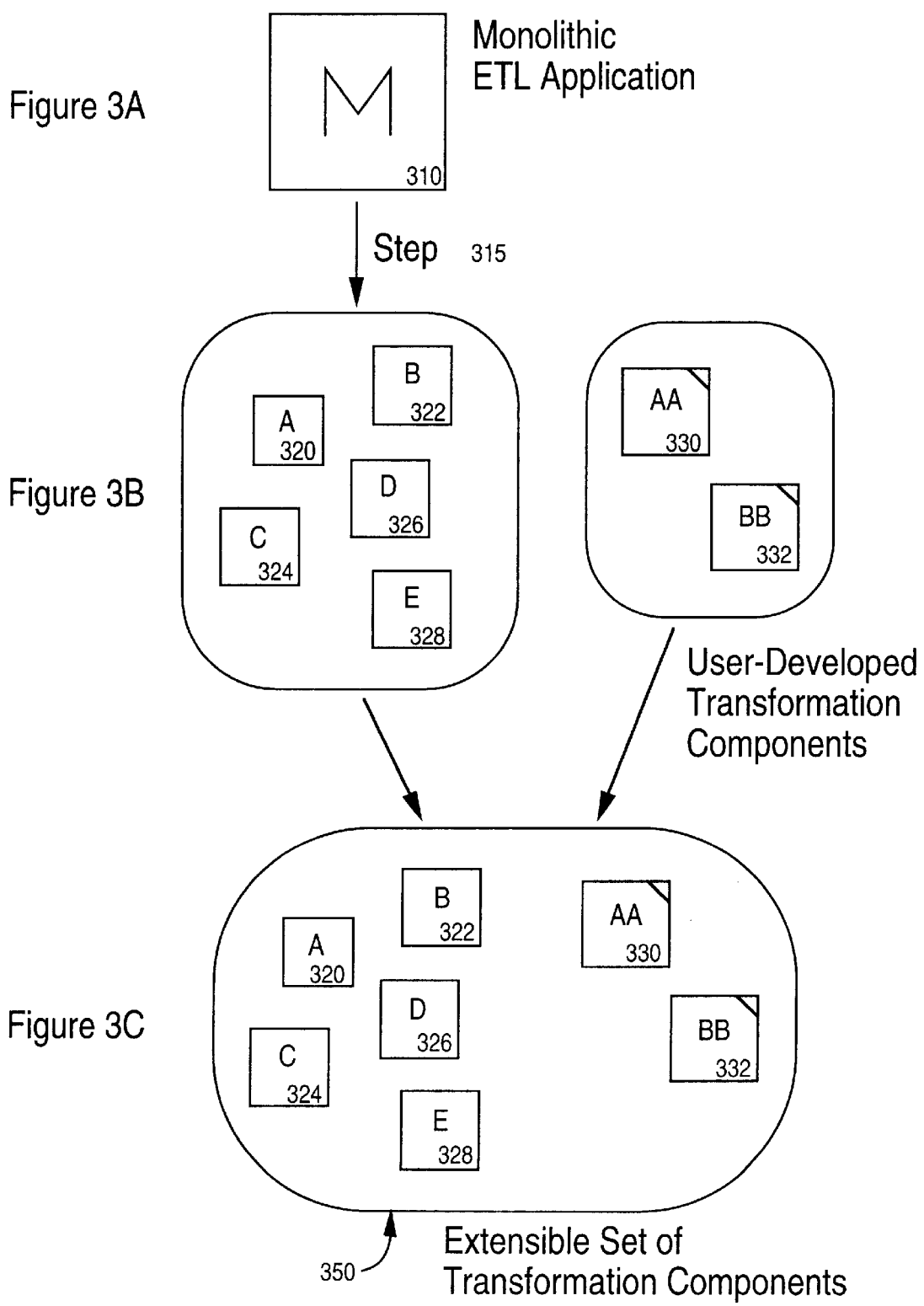
FIG. 3a, FIG. 3b, and FIG. 3c illustrate how the extensible set of transformation software is formed.

FIGS. 3A, 3B, and 3C represent the evolution of packaging software source code for the transformation application that implements the data ETL process. In FIG. 3A, the transformation application 310 is depicted as having packaged all the source code into one monolithic block. The issue of an architectural approach is absent. Data from a source input to transformation application 310 is transformed according to a specific, rigid set of rules and output to a target.

FIG. 3B depicts the next stage in the evolution of packaging software source code that implements the data ETL process. The arrow 315 indicates the step taken by the present invention's componentized architectural view in order to arrive at this stage of evolution. Instead of writing one block of source code that is responsible for all phases of the data ETL process, a more disciplined and architectural approach is taken in packing the source code such that the responsibility is distribute to smaller units (i.e., components) of source code. Each one of these software components is responsible for one specific type of transformation. For instance, each of blocks 330 and 332 depicts a user-developed transformation component (as opposed to a developer-developed transformation component).

In FIG. 3C, an extensible set 350 of transformation components is formed by transformation components 320, 322, 324, 326, and 328 which were originated from a monolithic transformation application such as M 310, together with transformation components developed by the users (e.g., blocks 330 and 332). This extensible set 350 of transformation components can be thought of as a pool (i.e., a base of ready-made transformation components from which the users can draw on to build functionally more sophisticated transformations in the data ETL process). This availability of using transformation components from this extensible set characterized the componentized aspect of the transformation architecture in the present embodiment of the present invention.

Figure 4:
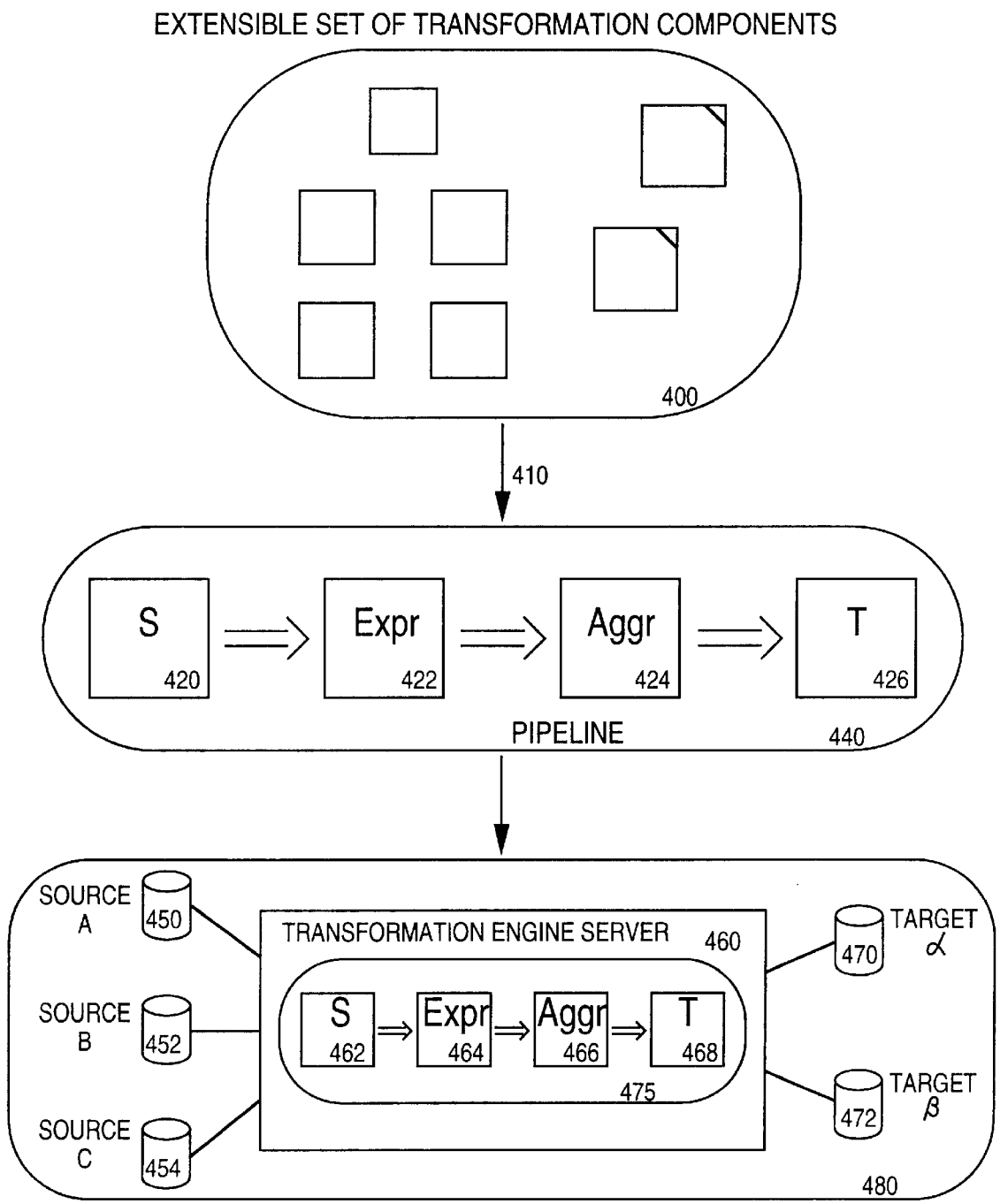
FIG. 4 illustrates the pipeline-based aspect of the architecture and how an execution pipeline of transformation components comes into being.

FIG. 4 illustrates the pipeline-based aspect of the transformation architecture through depicting one particular embodiment of the present invention. Again, the extensible set 400 of transformation components is shown here as a repository of transformation components available for use to build functionally more sophisticated transformations. Arrow 410 indicates the step taken by the users and enabled by the componentized aspect of the architecture to manually form a new transformation that consists of a cascading sequence of transformation components. For example, a pipeline can include a source table 420, an expression transformation 422, an aggregation transformation 424, and a target table 426. The original data, in the form of records, are stored in source table 420. The expression transformation 422 performs a calculation based on values within a single record from source table 420 (e.g., based on the price and quantity of a particular item, one can calculate the total purchase price for than line item in an order). Next, the aggregate transformation 424 is used to perform an aggregate calculation based on all records passed through the transformation (e.g., one can find the total number and average salary of all employees in a particular office using this transformation). The result is then stored as a record in a target table 426. This cascading sequence of transformation components exemplifies the pipeline-base aspect of the transformation architecture. The pipelined transformations exist within the transformation engine server 460. Data from any of the source tables 450, 452, and 454 can be transformed by the pipelined transformations within transformation engine server 460 and stored in either and/or both of target tables 470 and 472. Different transformations can be added; existing transformations can be removed; designated transformations can be moved to a different portion of the pipeline; additional pipeline stages can be created; multiple processes can run simultaneously within parallel pipeline stages; etc.

Figure 5:
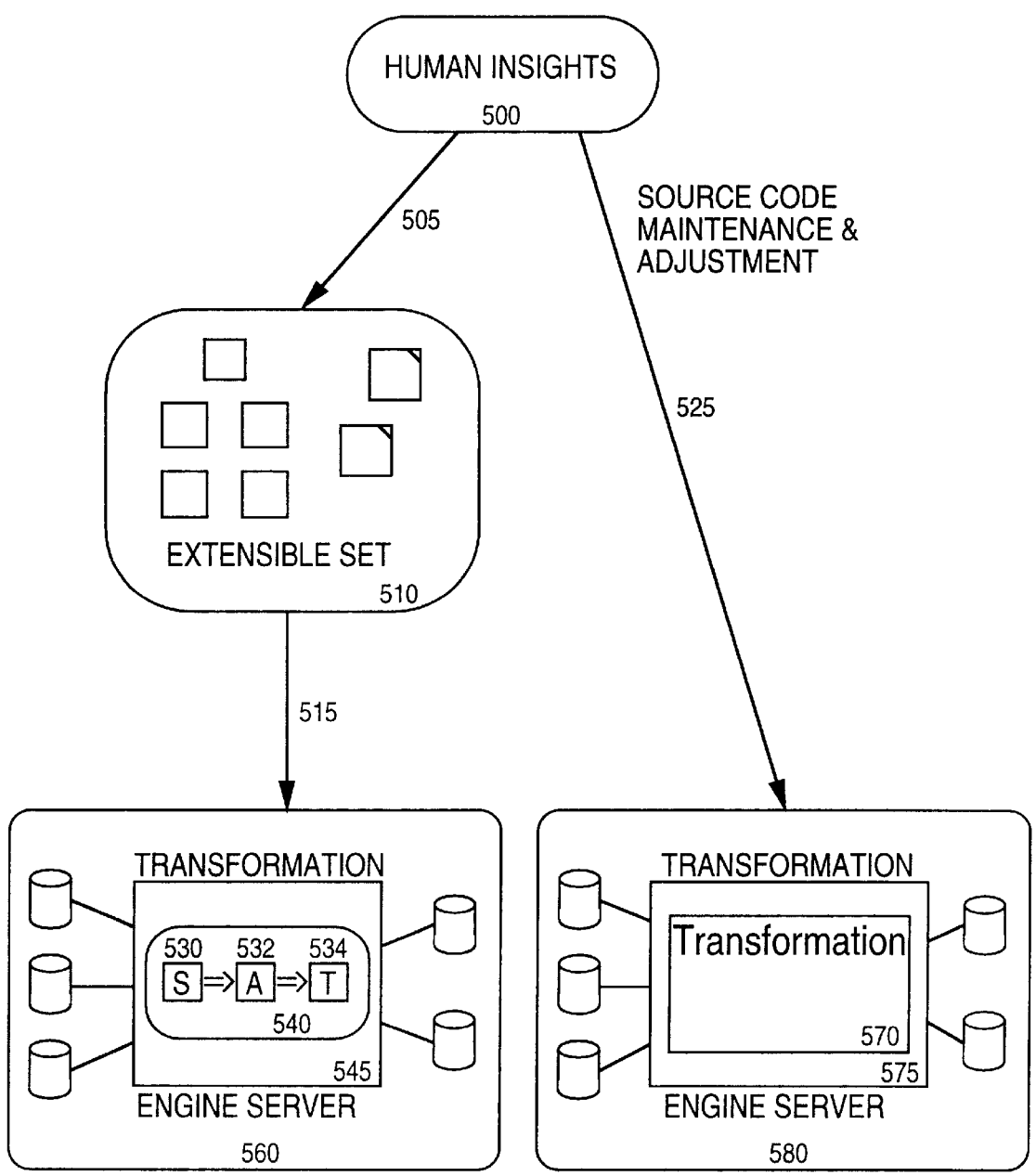
FIG. 5 illustrates how the extensible set of transformation components can be manually placed, with human insight, into the transformation server.

FIG. 5 illustrates the manual selection 515 of transformation components that are being formed into the pipeline 540. Basically, a set of transformations are componentized so that they may be coupled together (e.g., in a Lego-like fashion). FIG. 5 also contrasts the conventional ETL process 580 of application programs with the architectural ETL process 560 of the present invention. Both the componentized 510 and pipeline-based 540 aspects of the architecture work synergistically to allow a more direct expression of human insight, without getting caught up in expensive and time consuming code maintenance and adjustment 525. In every piece of software, distinction can be made between the portion of functionalities that responds (initiated by) manually and the portion of functionalities that responds to automation. The portion with automated functionalities, as to be expected, does most of the work involved. In fact, the unique mixture of manual and automated functionalities in each piece of software is what characterizes the quality, usefulness and pertinence of that particular piece of software. Thus, one of the novel characteristics of the present invention is that its architecture enables not only efficiency for the automated portion of the software 560, but goes further to also enable efficiency for the manual implementation steps (505 and 515) of the software. This componentized and pipeline-based architecture of the transformation server organizes the data ETL process such that optimal efficiency is gained both on the automated side and the manual side.

Figure 6:
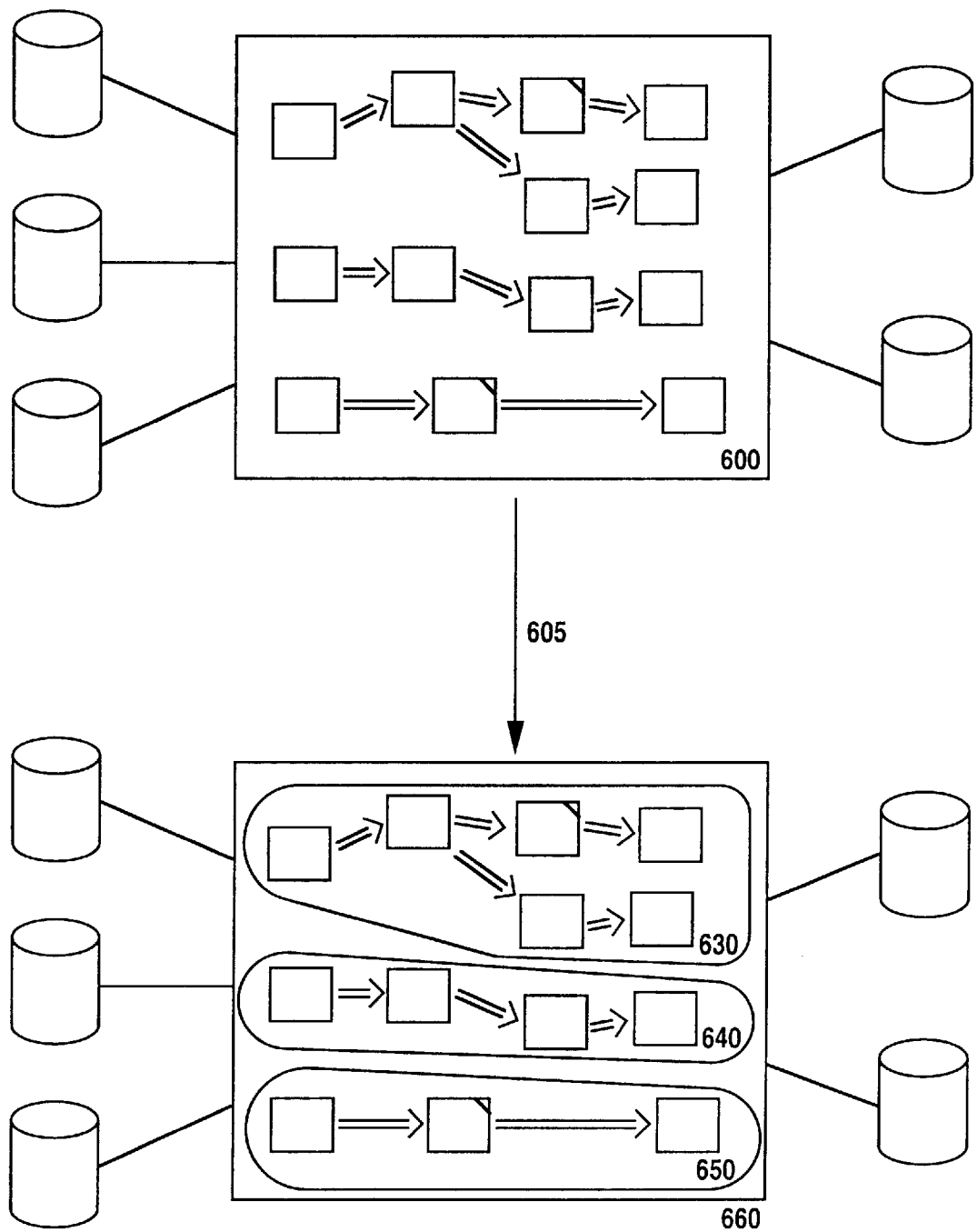
FIG. 6 illustrates one example of independent pipelines of transformation components for parallel executions.

FIG. 6 illustrates the pipeline-based aspect of the architecture and the level of pipelines of transformation components. An exemplary arrangement of transformation components that the users have selected from the extensible set of transformation components is shown. The arrows indicate the mapping defined by the transformation engine server. Transformation system 600 shows that three independent pipelines have naturally emerged. Each of the separate processes 630, 640, and 650 marks (separates) out the natural boundary of an independent task to be executed by the transformation engine server. The transformation engine server can then automatically utilizes the amount of available parallel processing power.

First of all, a degree of parallelism can be achieved such that one single thread can be dedicated to each of the tasks 630, 640, and 650 inside one process of the computer 660. Secondly, more parallelism can be achieved such that one single process can be dedicated to each of the tasks 630, 640, and 650. Furthermore, an even higher degree of parallelism can be achieved such that one single CPU inside a multi-CPU computer can be dedicated to each of the tasks 630, 640, and 650. Lastly, the users can also manually choose the extent of parallel processing desired.

Figure 7:
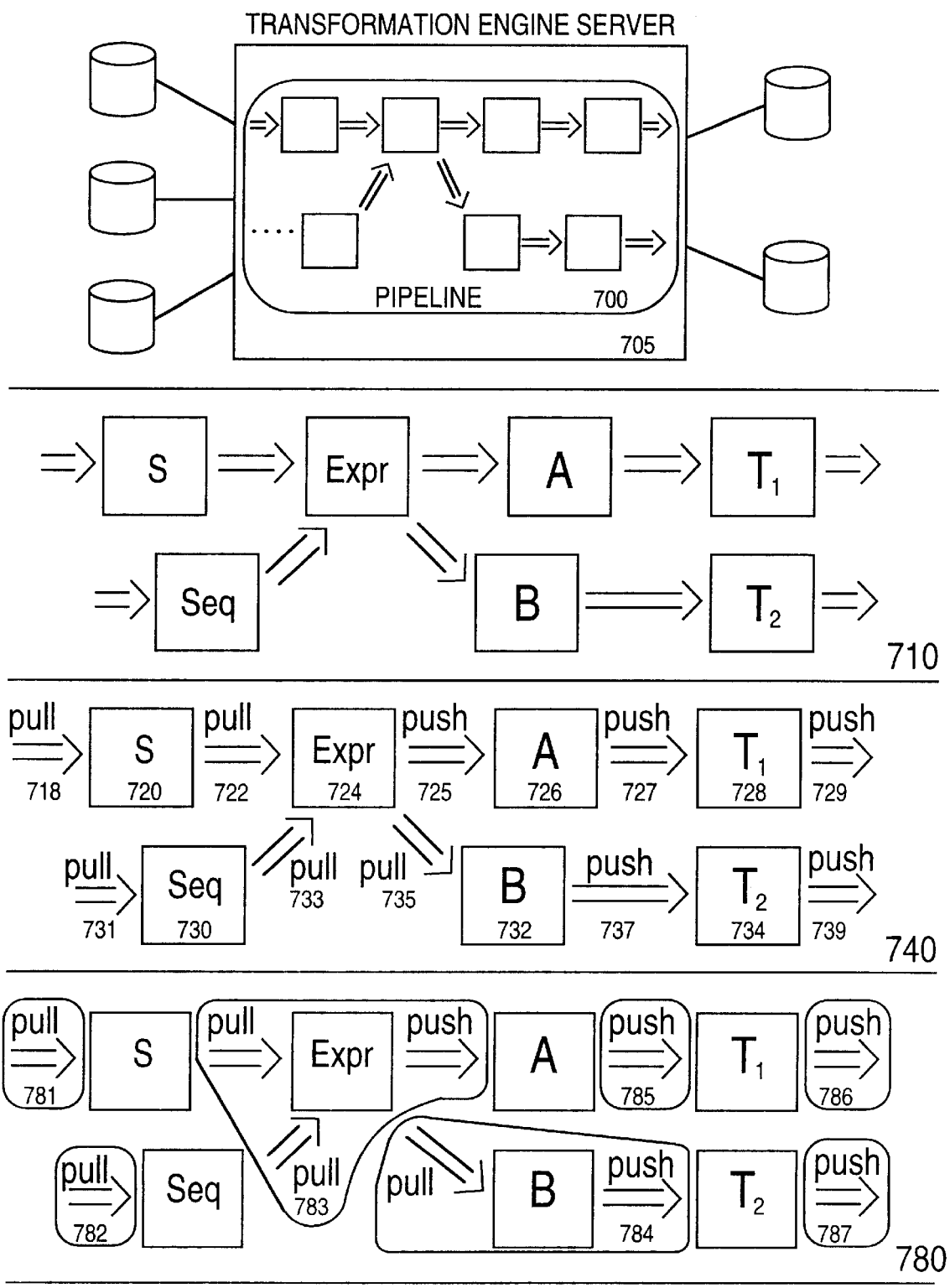
FIG. 7 illustrates one level of independence associated with the pipelined ETL architecture.

FIG. 7 illustrates another level of independence offered by the pipeline-based aspect of the data ETL architecture. In FIG. 7, steps taken by the server to mark out independent boundaries are depicted sequentially. But this time, the boundaries of independence emerge naturally within each pipeline of transformation components. For example, pipeline 700 of transformation engine server 705 depicts one single pipeline of transformation components. More specifically, pipeline 710 shows each of the transformations. A single transformation can accept one or more sets of inputs from one or more sources and/or prior transformations and can output one or more data sets to one or more subsequent transformations and/or targets. Furthermore, each transformation component, depending on its own functions, falls into one of three modes of data movement: push preferred mode, pull preferred mode, or a push/pull mode. Various transformation components are classified according to the mode of data movement.

For example, in transformation system 740, source 720 is in pull preferred mode (i.e., its active data movement consists of actively pulling data from "upstream" into itself for storage, while simultaneously passively allowing the transformed data to be pulled by expression 724. The pulling of the source data is depicted the arrow 721 pointing from source 720 to expression 724. At the same time, expression transformation 724 is in a push and pull mode (i.e., its data movement consists of actively pulling data from both source 720 and sequence 730, while simultaneously actively pushing data to a generic transformation component A 726. Transformation A 726 is in push preferred mode (i.e., its data movement consists of actively pushing data into target 728, while simultaneously passively receiving pushed data from expression 724. Another transformation 732 is in a push mode only (i.e., its data movement consists of actively pushing data to target 734.

Consequently, in this particular pipeline of transformation components, seven natural boundaries of independence have emerged (i.e., seven independent units 781–787 have emerged to which parallelism can be applied. First of all, the parallelism can be achieved such that one single thread can be dedicated to each of the tasks 781–787 inside one process of the computer. Secondly, more parallelism can be achieved such that one single process can be dedicated to each of the tasks 781–787 inside the RAM of the computer. Furthermore, an even higher degree of parallelism can be achieved such that one single CPU inside a multi-CPU computer can be dedicated to each of the tasks 781–787. Lastly, the users can also manually choose the extent of parallel processing desired.

Figure 8:
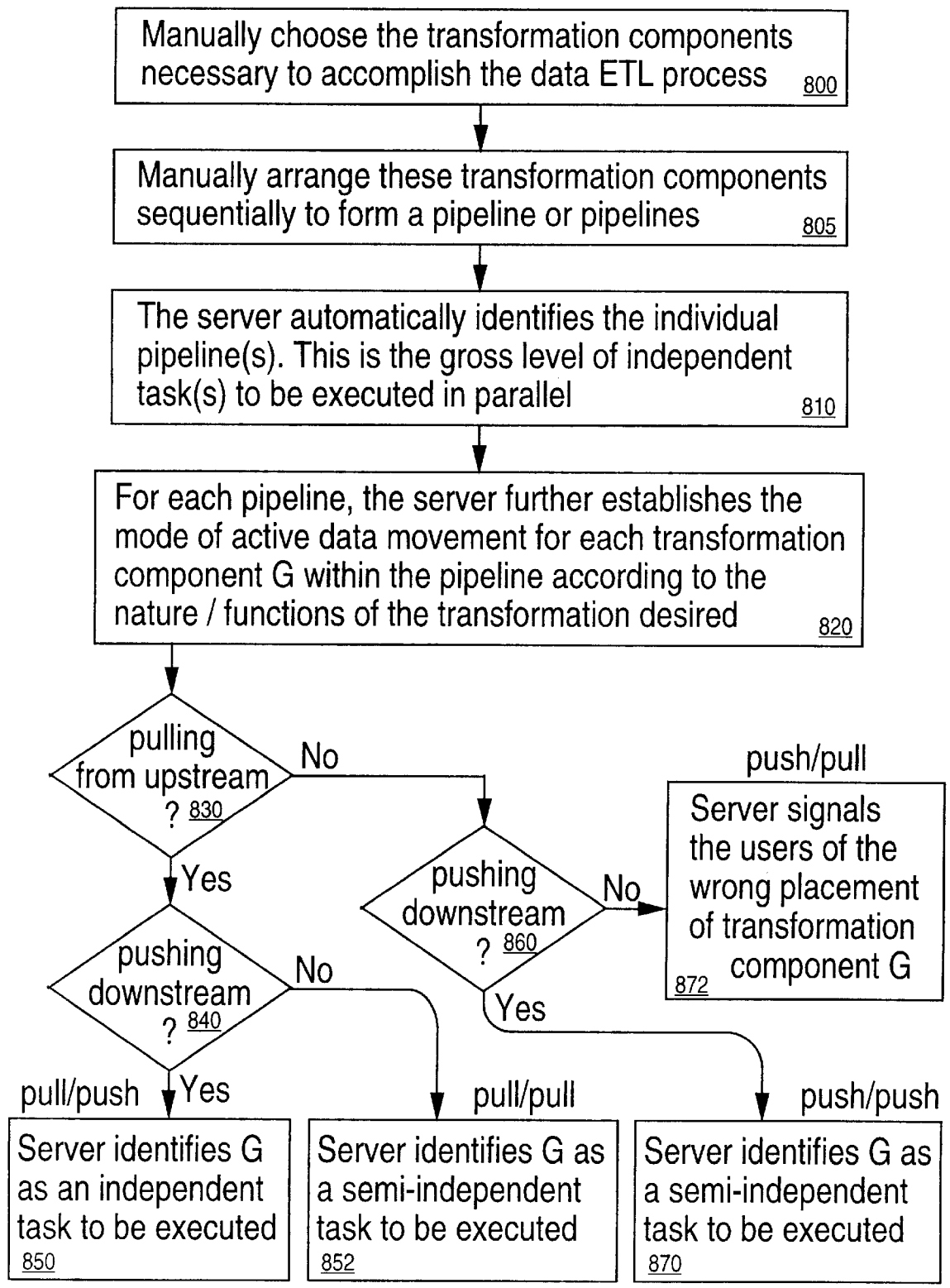
FIG. 8 is a flowchart describing the detailed steps for automated optimization of the ETL throughput.

FIG. 8 is a flowchart describing the detailed steps for automated optimization of the ETL throughput according to the present invention. Initially, the user manually chooses the transformation components necessary to accomplish the data ETL process, step 800. In step 805, the user also manually arranges the selected transformation components to form one or more sequential and/or parallel pipeline(s). For this architecture, steps 800 and 805 are manual; the remaining steps are performed automatically by the ETL software process without any human intervention or input. Step 810 indicates that the transformation engine server automatically starts to identify the individual pipeline(s) so that it can execute the pipeline(s) in parallel (e.g., simultaneously). Next, the transformation engine server automatically identifies a more intricate level of independent tasks so that it can execute these tasks in parallel, step 820. More specifically, the server establishes the mode of active data movement (e.g., mapping) for each transformation component within each of the pipeline(s) according to the nature/functions of the transformation desired. Steps 830, 840, and 860 determine to which mode each transformation component belongs. Step 850 indicates a pull/push mode; step 852 indicates a pull/pull mode; step 870 indicates a push/push mode; and step 872 indicates a push/pull mode. Thereupon, the transformation server selects the independent tasks to be executed in parallel based on the four modes identified by the transformation component. In a pull/push mode 850, the server identifies the transformation as an independent task to be executed. In a pull/pull mode 852, the server identifies the transformation as a semi-independent task to be executed. In a push/push mode 870, the server identifies the transformation as a semi-independent task to be executed. And in a push/pull mode 872, the server indicates that there has been a wrong placement of the transformation component.

FIG. 9 depicts one pipeline of transformation components having staging and streaming. For each transformation component, in essence, what would previous be a monolithic application has now been replaced with several separated pipelines of smaller \sized transformation component, each performing a more specific task. As data moves in and out of the transformation server, this componentized aspect of the ETL architecture enables a more optimized method for data staging as the data pass through each transformation component during the data ETL process, thereby improving throughput of the data ETL process. Whereas conventionally, staging of data occurs indiscriminately during almost all steps of the transformation application, the componentized architecture offers opportunity at each transformation component to select the optimal amount of data staging. For example, a small amount of memory can be dedicated to temporarily storing data from expression transformation 901. In contrast, data from the aggregate transformation 902 is not stored. Instead, the data is immediately streamed to the target.

In the more detailed example shown in FIG. 9, source 900 extracts from the source operational database two fields: a character field (f1) 905 and a numeric field (f2) 915 that contains each employee's yearly salaries. Character field contains the names of employees in an organization, and the numeric field 915 contains each employee's yearly salaries. The expression transformation 920 receives the f1 and f2 fields as input fields 924 and 928 respectively. After the specified expression is performed in the data, the resulting transformed data is placed in the two o1 and o2 output fields 934 and 938 respectively. In this simple example, during the transformation performed by expression transformation 920, the output field o1 acts as the function for input field I1 that transforms every character in I1 to be in uppercase: o1=UPPERCASE (I1). At the same time, field I2 remains unaltered and is the same as field o2. All in all, both I1 and I2 are transformed as they are passed into expression transformation 920. Consequently, the transformation component 920 does not need to perform data staging during its transformation process. Instead, the output data is immediately streamed onto the following stage.

The next stage is the aggregation transformation component 940. In contrast to the transformation component expression 920, the aggregation transformation component 940 requires data staging as it transform incoming data fields. Expression transformation component 920 has o1 and o2 fields that become the input 1 field and input 2 field of the aggregation transformation component 940. Here, in this embodiment of the present invention, output 1 is equal to input 1, while output 2 is the sum of all the yearly salaries given out to the employees: output 2=sum of all row entries in input 2 field. In other words, output 2=SUM (input 2). Aggregation 940 adds each row entries from field input 2 to a running total that will eventually become output 2 (i.e., the sum of all row entries from input 2). During the summing process, the quantity of running total needs to be stored (staged) in memory. In other words, data staging becomes necessary because the running total need to be kept track of. Usually, this staging occurs in RAM, then rims out to a storage disk as RAM storage space runs out. The final step depicted in this example is the movement of data fields output 1 and output 2 that becomes respectively field F1 and field F2 of the target 960.

In the currently preferred embodiment, there are thirteen different transformation components: source, target, expression, aggregation, filter, rank, update strategy, sequence, joiner, lookup, stored procedure, external procedure, and normalizer. The source transformation contains tables, views, synonyms, or flat files that provide data for the data mart/data warehouse. The target transformation maintains database objects or files that receive data from other transformations. These targets then make the data available to data mart users for decision support. Expression transformations calculate a single result, using values from one or more ports. The aggregation transformation calculates an aggregate value, such as a sum or average, using the entire range of data within a port or within a particular group. Filter transformations filter (selects) records based on a condition the user has set in the expression. The rank transformation filters the top or bottom range of records, based on a condition set by the user. The update strategy transformation assigns a numeric code to each record indicating whether the server should use the information in the record to insert, delete, or update the target. The sequence generator transformation generates unique ID numbers. The joiner transformation joins records from different databases or file systems. The lookup transformation looks up values. The stored procedure transformation calls a stored procedure. The external procedure transformation calls a procedure in a shared library or in the COM layer of Windows NT. And the normalizer transformation normalizes records, including those read from virtual storage access method (VSAM) sources. In the currently preferred embodiment, the source, target, aggregation, rank, and joiner transformations are all staged transformations. The data generated by these transformations are automatically staged by the software, without human interaction. The expression, filter, update strategy, sequence, lookup, stored procedure, external procedure, and normalizer transformations are all streamed transformations. Other new types of transformations can be added to this list. These new transformations can be specified as being either staged or streamed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modification as are suited to the particular use contemplated. It is intended the scope of the invention be defined by the claims appended hereto and their equivalents.

What is claimed is:

1. A computer implemented method for transforming data in a data warehousing application, comprising the steps of:

specifying at least one source containing data;

constructing a plurality of transformation components for manipulating data according to pre-determined sets of rules;

coupling the transformation components to form one or more pipelines;

specifying a target for storing data generated by one or more of the pipelines;

staging data in a first of said plurality of transformation components; and streaming data in a second of said plurality of transformation components, wherein said staging and said streaming of data are performed automatically by software without human intervention.

2. The computer implemented method of claim 1, wherein a source transformation component, a target transformation component, an aggregation transformation component, a rank transformation component, and a joiner transformation component perform the staging step.

3. The computer implemented method of claim 2, wherein an expression transformation component, a filter transformation component, an update strategy transformation component, a sequence transformation component, a lookup transformation component, a stored procedure transformation component, an external procedure transformation component, and a normalizer transformation component perform the streaming step.

4. The computer implemented method of claim 1 further comprising the step of pushing data from a first transformation component to a second transformation component.

5. The computer implemented method of claim 1 further comprising the step of pulling data from a first transformation component to a second transformation component.

6. The computer implemented method of claim 5 further comprising the step of pushing data from a third transformation component to a fourth transformation component.

7. The computer implemented method of claim 1 further comprising the step of a first transformation component pulling data from a second transformation component and pushing data to a third transformation component.

8. The computer implemented method of claim 1 further comprising the step of executing a plurality of tasks in parallel through a plurality of the pipelines.

9. A computer-readable medium having stored thereon instructions for causing a computer to transform data in a datamart application, comprising:

a source containing original data;

a plurality of transformation components for manipulating data according to pre-determined behaviors;

a mapping which specifies an order for coupling the transformation components to form one or more pipelines;

a target for storing data generated by one or more of the pipelines;

memory for staging said data generated by a first of said plurality of transformation components;

a second of said plurality of transformation components operable to stream said data generated by said second of said plurality of transformation components; and instructions for automatically staging or streaming of data by each of the plurality of transformation components.

10. The computer-readable medium of claim 9, wherein a source transformation component, a target transformation component, an aggregation transformation component, a rank transformation component, and a joiner transformation component stage data.

11. The computer-readable medium of claim 10, wherein an expression transformation component, a filter transformation component, an update strategy transformation component, a sequence transformation component, a lookup transformation component, a stored procedure transformation component, an external procedure transformation component, and a normalizer transformation component stream data.

12. The computer-readable medium of claim 9 further comprising instructions for pushing data from a first transformation component to a second transformation component.

13. The computer-readable medium of claim 9 further comprising instructions for pulling data from a first transformation component to a second transformation component.

14. The computer-readable medium of claim 13 further comprising instructions for pushing data from a third transformation component to a fourth transformation component.

15. The computer-readable medium of claim 9 further comprising instructions for a first transformation component pulling data from a second transformation component and pushing data to a third transformation component.

16. The computer-readable medium of claim 15 further comprising instructions for executing a plurality of tasks in parallel through a plurality of the pipelines.

* * * * *